United States Patent
Pithawala et al.

(10) Patent No.: US 8,291,072 B2
(45) Date of Patent: *Oct. 16, 2012

(54) METHOD AND APPARATUS PROVIDING DEVICE-INITIATED NETWORK MANAGEMENT

(75) Inventors: Burjiz Pithawala, San Jose, CA (US); L. Alexander Clemm, Los Gatos, CA (US)

(73) Assignee: Cisco Technology, Inc., San Jose, CA (US)

(*) Notice: Subject to any disclaimer, the term of this patent is extended or adjusted under 35 U.S.C. 154(b) by 121 days.

This patent is subject to a terminal disclaimer.

(21) Appl. No.: 12/945,763

(22) Filed: Nov. 12, 2010

(65) Prior Publication Data

US 2011/0060829 A1 Mar. 10, 2011

Related U.S. Application Data

(63) Continuation of application No. 10/803,772, filed on Mar. 17, 2004, now Pat. No. 7,856,493.

(51) Int. Cl.
*G06F 15/173* (2006.01)
(52) U.S. Cl. ........................ 709/224; 709/223
(58) Field of Classification Search .................. 709/217, 709/219, 223, 224
See application file for complete search history.

(56) References Cited

U.S. PATENT DOCUMENTS

| | | | |
|---|---|---|---|
| 5,737,536 A | 4/1998 | Herrmann et al. | |
| 6,003,084 A | 12/1999 | Green et al. | |
| 6,058,420 A * | 5/2000 | Davies | 709/224 |
| 6,131,117 A | 10/2000 | Clark et al. | |
| 6,189,043 B1 | 2/2001 | Buyukkoc et al. | |
| 6,263,368 B1 | 7/2001 | Martin | |
| 6,279,038 B1 | 8/2001 | Hogan et al. | |
| 6,321,338 B1 | 11/2001 | Porras et al. | |
| 6,614,781 B1 * | 9/2003 | Elliott et al. | 370/352 |
| 6,658,469 B1 | 12/2003 | Massa et al. | |
| 6,766,368 B1 | 7/2004 | Jakobson et al. | |
| 7,010,586 B1 * | 3/2006 | Allavarpu et al. | 709/223 |
| 7,228,330 B2 * | 6/2007 | Vignaud | 709/203 |
| 7,433,941 B1 | 10/2008 | Lavian et al. | |
| 2002/0184360 A1 * | 12/2002 | Weber et al. | 709/223 |
| 2003/0191795 A1 | 10/2003 | Bernardin et al. | |
| 2004/0039803 A1 * | 2/2004 | Law | 709/223 |
| 2004/0268148 A1 | 12/2004 | Karjala et al. | |

\* cited by examiner

*Primary Examiner* — Philip B Tran
*Assistant Examiner* — Marie Georges Henry
(74) *Attorney, Agent, or Firm* — Hickman Palermo Truong Becker Bingham Wong LLP

(57) ABSTRACT

A method is disclosed for managing a network entity that is initiated by the network entity, the method comprising the computer-implemented steps performed at the network entity of monitoring the network entity; periodically evaluating one or more specified conditions at the managed network entity; when one or more of the specified conditions are satisfied, then gathering specified information from the managed network entity, preparing a message that includes the specified information and the specified conditions that were satisfied, and sending the message to a management point.

21 Claims, 5 Drawing Sheets

METHOD AND APPARATUS PROVIDING DEVICE-INITIATED NETWORK MANAGEMENT

PRIORITY CLAIM

This application claims benefit under 35 U.S.C. §120 as a Continuation of application Ser. No. 10/803,772, filed Mar. 17, 2004, U.S. Pat. No. 7,856,493, the entire contents of which is hereby incorporated by reference as if fully set forth herein. The applicants hereby rescind any disclaimer of claim scope in the parent applications or the prosecution history thereof and advise the USPTO that the claims in this application may be broader than any claim in the parent applications.

FIELD OF THE INVENTION

The present invention generally relates to data processing. The invention relates more specifically to network management systems and methods.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Contemporary computer networks have developed increasing complexity and require regular and active management. Such networks may comprise large numbers of routers, switches, gateways and other active elements of network infrastructure. Traditionally, network management has been accomplished using a network management station (NMS) that communicates with one or more network elements, issues requests to the network elements, and obtains data values from the network elements. The requested data is evaluated by network management personnel, who may elect to send commands or issue re-configuration information to the network elements.

A drawback of this approach is that the NMS must have access to all network elements that it manages. When the NMS forms part of a private network such as a corporate LAN or WAN, this issue is not a significant factor because the NMS may be configured within the same security domain that includes the network elements. However, many networks are now owned, operated and/or managed by managed service providers (MSPs) that are physically or logically separate from the business enterprise or other party that actually uses the networks. An MSP is a network service provider, often a traditional ISP or telecommunications company, that manages a network for another party.

In this scenario, one MSP may need to manage multiple networks that are used by different business enterprises. Each of the networks is maintained as a separate secured environment by the business enterprise, which typically closely guards the security of its network. One security technique often used in this environment is private network addressing, in which the business enterprise and not the MSP assigns private network addresses to the network elements. Consequently, the MSP may not know the addresses that are in use at the time that the MSP needs to perform a management operation. Another common security technique involves deploying a firewall to screen messages directed into the private network. The Simple Network Management Protocol (SNMP) is commonly used for sending management requests, but firewalls may be configured to block SNMP requests from outside entities. Further, even when SNMP can be used, typically it cannot be used to retrieve sufficient information for evaluation at the management point. As a result, the MSP has difficulty "reaching into" the managed network to retrieve configuration information, to retrieve information not supported by SNMP, or to issue commands. It may be impractical for the MSP to require its customers to cease using dynamic addressing schemes.

Moreover, network users and MSPs have developed increasing interest in deploying self-managing network elements. While some degree of management always will be required, network users and MSPs are seeking to make networks more autonomous by reducing the amount of human intervention involved in acquiring information from a network, determining the meaning of the information, making decisions about the information, and translating the decisions into management actions that are performed in the network. It would be undesirable if the MSP had to use a "truck roll" or locally deployed MSP technician, interacting with local support staff, for obtaining the needed information, determining that faults have occurred, or implementing changes in the managed network.

Still another issue relates to difficulties in sending out diagnostic information from a device. For example, a device may generate and send an alarm upon the occurrence of an alarm condition. However, a remote device or management system may encounter difficulty in diagnosing the cause of the alarm occurs, because at that time, the device may no longer be reachable, or reach-through is performed not timely and unnecessarily delays troubleshooting and diagnosis. Therefore, transmittal of all pertinent information at the onset of a major problem, as defined through a user policy, is required, that allows decisions to be made at a remote network operations center without need for further on-site intervention.

No prior approach is believed to provide device-initiated network management. Such prior approaches that are lacking in one or more respects include policy-based management, automatic update system that are used, for example, in computer operating systems, and alarm correlation. Device announcement protocols have been provided in the products of Stratacom and in Ungerman-Bass switches, but these have been impractical to use in large networks containing thousands of network elements. The Cisco Discovery Protocol is a known method of discovering devices in a network, but for success all such devices must be CDP-compatible, which is not true in large, heterogeneous networks.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for device-initiated network management is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Device-Initiated Network Management Methods
    3.1 Managing Networks Through Decoupled Management Communications Across Network Administrative and Security Boundaries
    3.2 Enabling Network-Initiated Remote Monitoring and Maintenance Operations
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for managing a network entity that is initiated by the network entity, the method comprising the computer-implemented steps performed at the network entity of monitoring the network entity; periodically evaluating one or more specified conditions at the managed network entity; when one or more of the specified conditions are satisfied, then gathering specified information from the managed network entity, preparing a message that includes the specified information and the specified conditions that were satisfied, and sending the message to a management point.

In another aspect, an embodiment provides a method of managing a network entity that is initiated by the network entity, the method comprising the computer-implemented steps of receiving a request from a management application for interaction with the managed network entity; creating a management request that includes a network element identifier; storing a management request in a management proxy while awaiting a poll for the management request from the managed network entity; receiving a periodic poll message from the managed network entity, wherein the poll message requests any available management requests applicable to the managed network entity; selecting one or more management requests that match the managed network entity; and delivering the selected one or more management requests to the managed network entity.

According to one feature of this aspect, the method further comprises receiving a responsive management message from the managed network entity; storing the responsive management message in the management proxy; receiving a second poll message from the management application, wherein the second poll message requests any responsive management messages applicable to the management application; selecting one or more responsive management messages that match the management application; and delivering the selected one or more responsive management messages to the management application.

In another feature, the network entity is within a private network that is managed by a network service provider, and wherein the management point is within a public network that is owned or operated by the network service provider. In yet another feature, the network entity is a service appliance. According to still another feature, the network entity is a switch or router.

In another aspect, an embodiment provides a system for managing a network entity, comprising one or more management applications hosted in a service provider network; a management communication program that is and communicatively coupled to the management services, and comprising one or more sequences of instructions which, when executed by the network entity, causes the network entity to perform the steps of monitoring the network entity; periodically evaluating one or more specified conditions at the network entity; when one or more of the specified conditions are satisfied, then gathering specified information from the network entity, preparing a message that includes the specified information and the specified conditions that were satisfied, and sending the message to the management services.

In one feature of this aspect, the system further comprises a management communication transport element hosted in the private network, and wherein the step of sending the message to the management services comprises the step of sending the message to the management services using the management communication transport element. Many other features are disclosed herein. Further, in other aspects, the invention encompasses a computer apparatus and a computer-readable medium configured to carry out the foregoing steps.

2.0 Structural and Functional Overview

Figure 1:
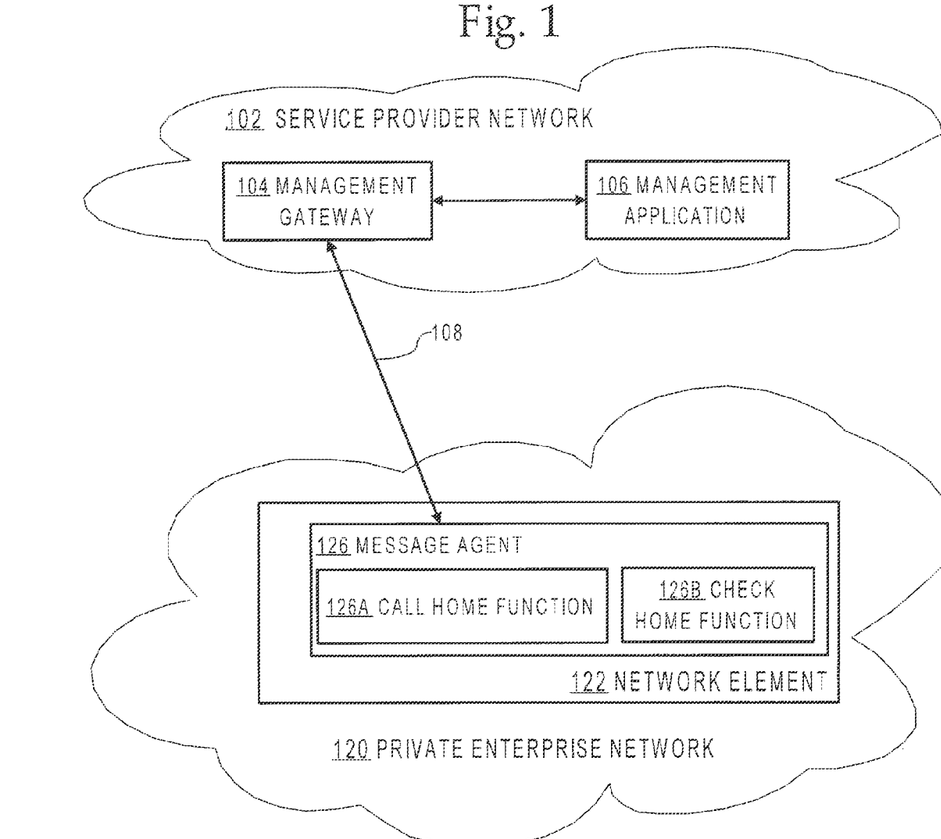
FIG. 1 is a block diagram of a system for device-initiated network management.

FIG. 1 is a block diagram of a system for device-initiated network management. A service provider network 102 comprises a management gateway 104 and one or more management applications 106. In one embodiment, a service provider associated with the service provider network 102 is a managed service provider (MSP). A private enterprise network 120 comprises a network element 122 that hosts a message agent 126 that includes a call home function 126A and a check home function 126B. A practical embodiment may include any number of network elements 122 arranged in any suitable topology.

Management gateway 104 is communicatively coupled to message agent 126 by a link 108. Link 108 may comprise one or more direct links or may traverse any number of intermediate network elements or networks. Thus, service provider network 102 may be co-located with private enterprise network 120 or the networks may be at widely separated physical locations. In any such scenario, service provider network 102 is logically separate from private enterprise network 120.

Figure 2:
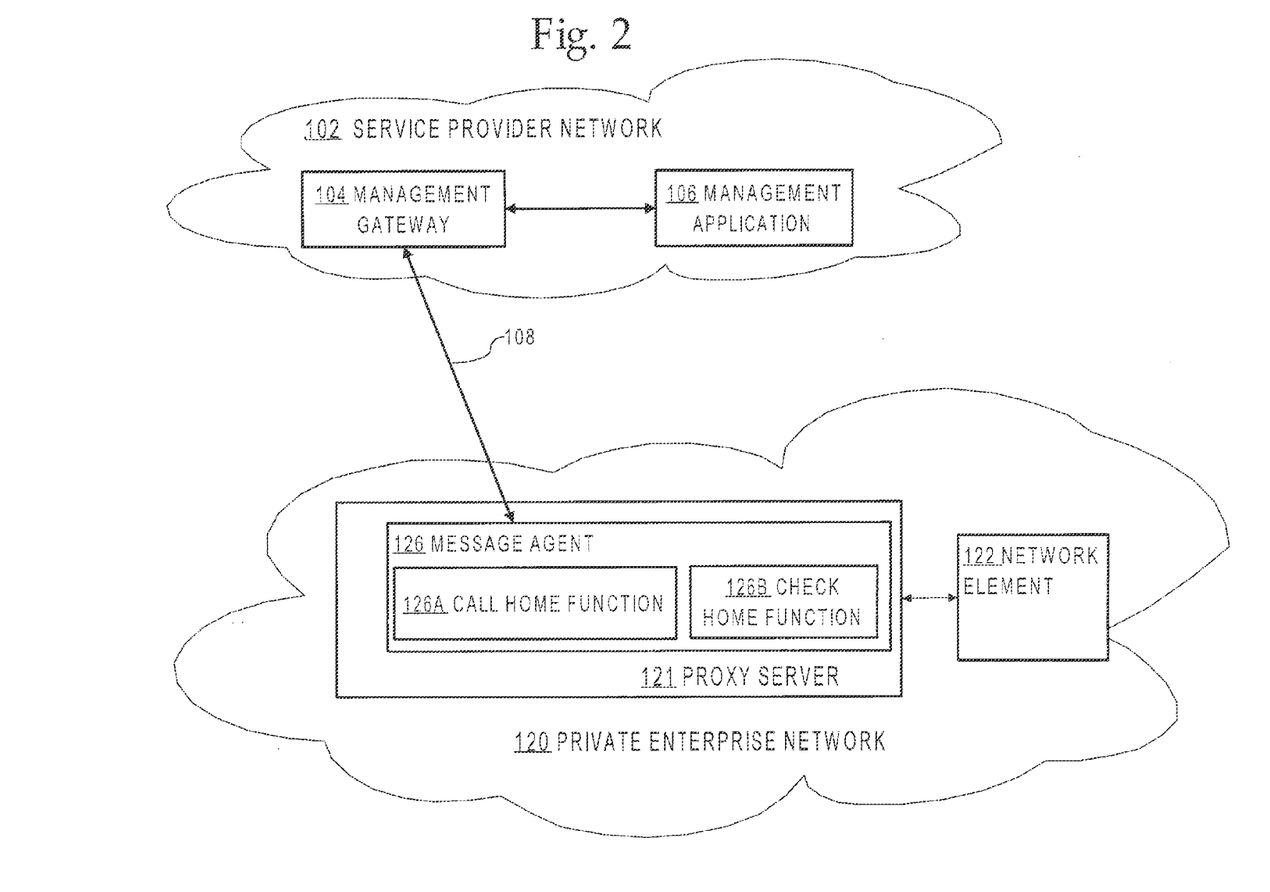
FIG. 2 is a block diagram of an alternative embodiment of a system for device-initiated network management.

FIG. 2 is a block diagram of an alternative embodiment of a system for device-initiated network management.

FIG. 2 generally contains the same structural elements as shown in FIG. 1. However, message agent 126 is hosted in a proxy server 121 in private enterprise network 120 external to network element 122.

In any of the foregoing embodiments, network element 122 may comprise any network element such as a router, switch, or other infrastructure element. The private enterprise network 120 may be associated with an individual, business enterprise, government, or any other type of entity.

In any of the foregoing embodiments, methods of device-initiated network management may be performed, as described in the next section. Device-initiated network management provides methods by which service provider network 102 may manage network element 122 or other elements of private enterprise network 120. The methods are network initiated rather than initiated by a manager or NMS. The methods may be performed without a direct coupling of an NMS to the managed network element.

Generally, approaches herein enable a network element or network that is deployed at a customer or other party to establish contact with an outside organization that provides management services for the customer, and to carry out instructions issued by the MSP or other outside organization. In one deployment scenario, a managed service provider uses the approaches herein to provide management services to a private enterprise. In another deployment scenario, an equipment vendor implements the approaches to carry out maintenance services, such as by providing an upgrade to equipment in the field.

In one approach, elements of a remote network can autonomously contact and notify a MSP about events that require the attention of the MSP or its staff, or intervention, with appropriate context information. In another approach, an MSP can reach the remote network with management requests that are created and stored by the MSP, but the remote network initiates retrieval and processing of the requests. In combination, the two approaches provide comprehensive management coverage for an MSP that needs to manage remote networks. However, each approach may be used separately, and neither approach requires the other approach.

3.0 Device-Initiated Network Management Methods

Figure 3A:
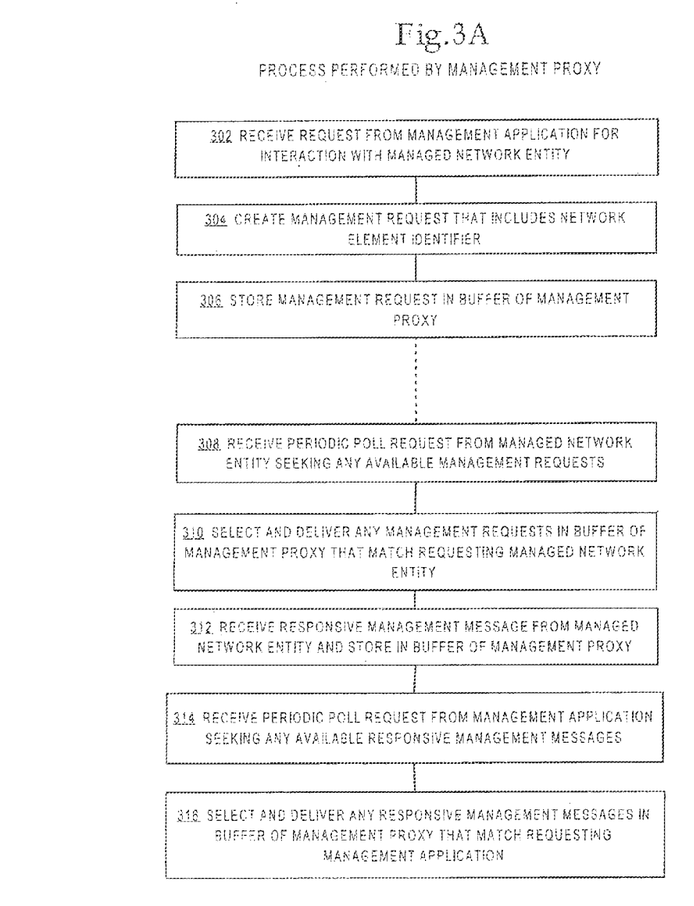
FIG. 3A is a flow diagram that illustrates one embodiment of a method for device-initiated network management.
Figure 3B:
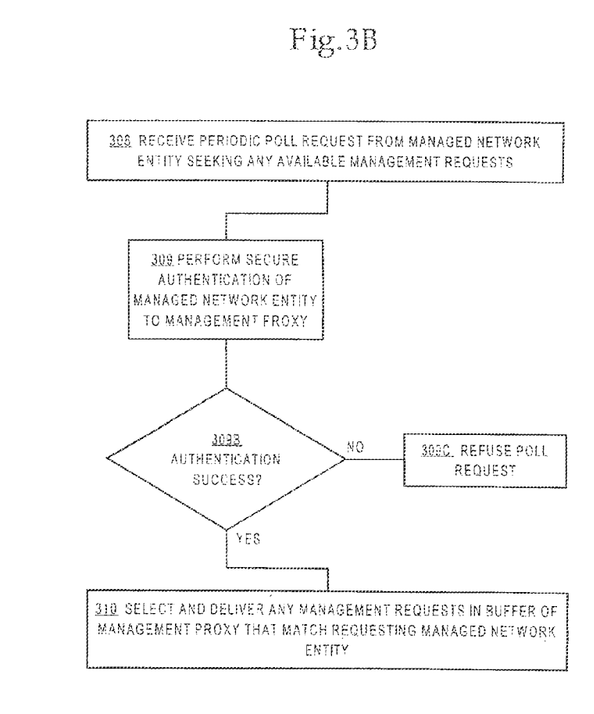
FIG. 3B is a flow diagram of further steps that may be performed as part of step 308 of FIG. 3A.
Figure 4:
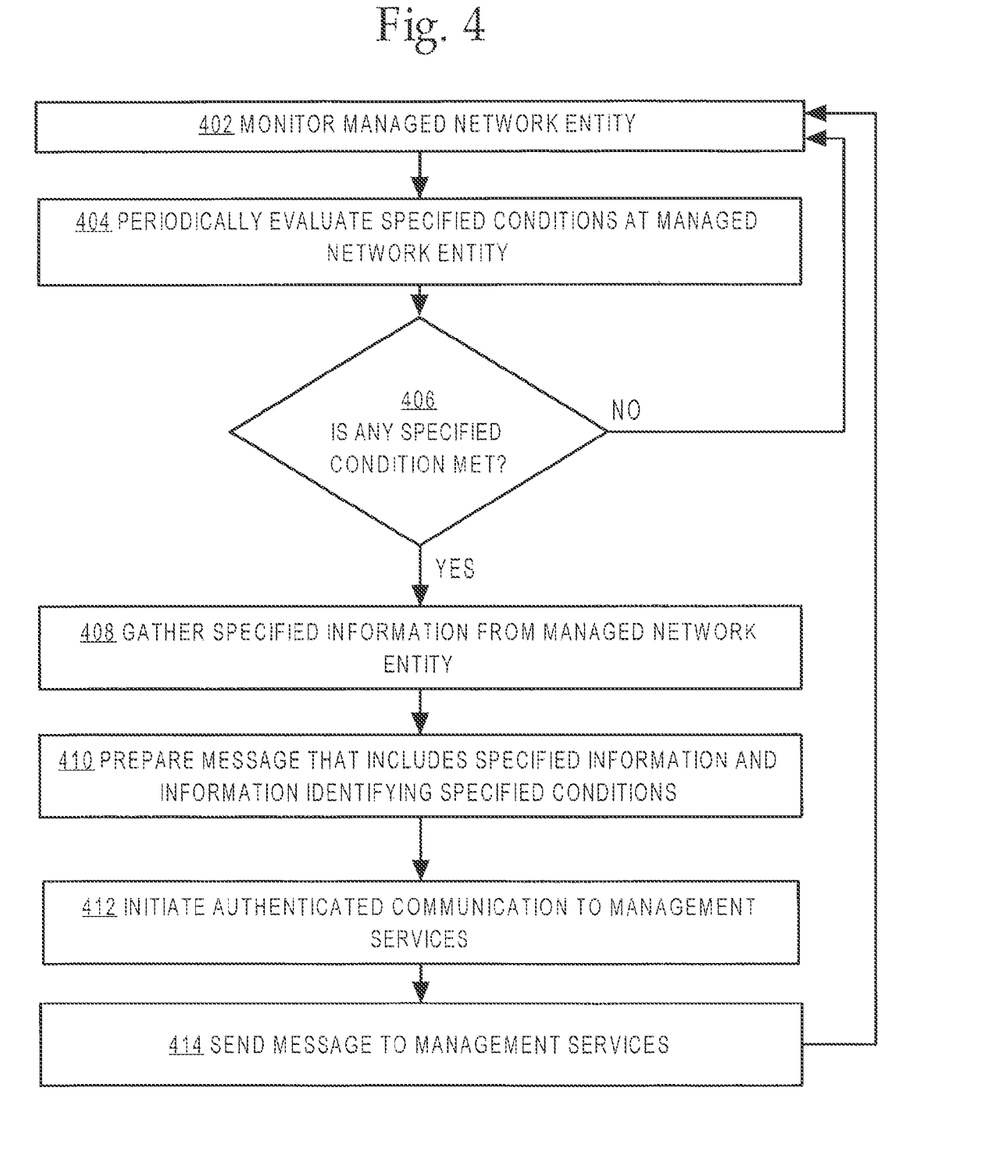
FIG. 4 is a flow diagram that illustrates an embodiment of another, complementary method for device-initiated network management.

FIG. 3A is a flow diagram that illustrates one embodiment of a method for device-initiated network management; FIG. 3B is a flow diagram of further steps that may be performed as part of step 308 of FIG. 3A; FIG. 4 is a flow diagram that illustrates an alternative embodiment of a method for device-initiated network management. In one embodiment, the methods of FIG. 3A, FIG. 3B, are concerned with how equipment deployed at a customer site, with private addressing and/or behind firewalls, can securely communicate with an outside service provider organization. The process of FIG. 4 is primarily concerned with what circumstances should trigger device-initiated contact with a management point and the type of operations that are automatically carried out as a consequence.

The processes may be implemented in the form of one or more computer programs or other software elements that are hosted or executed by a server, router, switch, or other host. The programs or software elements may cooperate with hardware and/or firmware to accomplish the functions described herein.

According to one embodiment, a method is provided to enable network-initiated remote monitoring and maintenance operations for network elements. A network element can contact the service provider network if certain predefined or specified conditions are met. The specified conditions can include certain types of events, event patterns, event severities, value of certain states, etc. The network element can communicate all information necessary to determine what action should be taken at the network element through remote action directed by the service provider network. For example, the information may include state information, a core dump from the network element, a current configuration of the network element, output from a "show" command, etc. The methods may be performed by processing elements hosted on a network element or hosted by a proxy.

In another embodiment, a method is provided for managing networks through decoupled management exchanges that occur across network boundaries of administrative and security domains. In effect, a network operations center can "reach through" the private enterprise network 120 to reach a network element 122 for testing, diagnosis, information retrieval, re-configuration, or other management purposes. In one approach, a management communication element in private enterprise network 120 retrieves, from service provider network 102, current management requests and deposits responses or event information. The management communication element resides on the network element 122, as in FIG. 1, or is hosted in a proxy as in FIG. 2.

For convenience, the approaches of FIG. 3A, FIG. 3B, FIG. 4 are now described with reference to the embodiment of FIG. 1. However, the approaches of FIG. 3A, FIG. 3B, FIG. 4 also may be practiced in the embodiment of FIG. 2. The approaches of FIG. 3A, FIG. 3B represent an example implementation of check home function 126B. The approach of FIG. 4 represents an example implementation of call home function 126A.

3.1 Managing Networks Through Decoupled Management Communications Across Network Administrative and Security Boundaries Referring first to FIG. 3A, in step 302, a request is received from a management application for interaction with a managed network entity. For example, management gateway 104 receives a request from management application 106, or another management service or system in the service provider network 102, to retrieve the then-current configuration from network element 122.

In step 304, a management request that includes a network element identifier is created, and the management request is stored in a buffer of a management proxy in step 306. As an example, management gateway 104 creates and stores data that encapsulates the request from the management application and that includes a network element identifier that is unique with respect to all network elements managed by the associated service provider. In one embodiment, each request record contains an identification of the application, its credentials, the address and method to use to contact it, and credentials that it needs to present to the network element. Optionally, a management gateway can internally maintain a flag value indicating whether the request record has been delivered to a network element.

At an indeterminate time thereafter, which may be instantaneous, short, or long, in step 308 a poll request is received from a managed network entity. The request may be in the form of a poll seeking any available management requests that pertain to the network entity. For example, at some point network element 122 uses message agent 126 to send a poll inquiry over link 108 to management gateway 104. The poll inquiry asks the management gateway 104 whether the gateway has any stored management requests that identify network element 122. In this manner, network element 122 initiates management of itself, rather than merely replying to requests from an NMS as in prior approaches.

In one embodiment, a poll inquiry comprises an HTTPS GET request that is sent by the network element 122 and contains a URI that contains a management identifier of the network element.

In block 310, any management requests in the buffer of the management proxy that match the requesting managed network entity are selected and delivered. Thus, in reply to the poll inquiry from network element 122, management gateway 104 determines whether its buffer contains any application requests that match the requesting network element 122. If so, the management gateway 104 delivers the matching requests to the network element 122. Matching may involve determining whether the management identifier of the network element is found in any stored application request. If there are no matching requests, then the management proxy may return an empty list.

It is assumed that network element 122 processes the application request in some way and creates responsive information. Thus, in step 312, a responsive management message is received from the managed network entity and stored in the buffer of the management proxy. If the network element is unable to process a request from an application, the network element returns a message that indicates the request could not be processed. The management proxy marks the flag value of the request record to indicate that the request could not be processed. A network element might be unable to process a request because, for example, the request specifies an access method that the network element does not support.

At some point in time thereafter, in block 314, a poll request is received from a management application seeking any available responsive management messages. In block 316, any responsive management messages stored in the management proxy that match the requesting management application are selected and delivered.

Using the foregoing approach, a management proxy mediates interaction of a management application and a network element. Moreover, the network element initiates retrieval, processing, and replies to management requests. As a result, an application is not blocked from accessing a network element as a result of private network security measures such as firewalls, private addressing, etc.

Referring now to FIG. 3B, as part of performing step 308 of FIG. 3A, steps 309, 309B, and 309C may be performed. In step 308, a poll request is received from a managed network entity as described above. In step 309, the managed network entity is authenticated in a secure manner to the management proxy. In step 309B, a test is performed to determine whether successful authentication occurred. If not, then the management proxy cannot verify that a requesting network element is authorized to receive management request information. Therefore, in step 309C, the poll request is refused. Alternatively, if successful authentication occurs, then in block 310, matching management requests are delivered as described above.

Accordingly, this section has described the operation of a management gateway that allows management applications to manage remote networks through conventional management communications, even if the applications cannot physically reach through to those networks. The management gateway receives management requests targeted at specific network elements. The network elements are identified through a general management identifier, which is passed in a specific wrapper message. The management gateway buffers the requests, and does not process the requests, which are treated as opaque payloads. The requests may comprise command-line interface (CLI) commands formatted in syntax understandable to a network element, SNMP requests, or any other kind of request.

The managed entities in the network periodically poll the management gateway to determine whether a new management request has arrived. If so, the request is obtained and performed, and a result is conveyed back to the management gateway. The result is stored and not interpreted or processed. Thereafter, the management gateway conveys the result of the operation back to the management application. The management application and managed entity are completely decoupled. Likewise, event notifications are communicated to the gateway, which in turn can communicate them to subscribing applications. Such communication can occur through retrieval by the application upon request to the gateway, or through direct subscription by the application.

In one embodiment, the management gateway does not maintain a mapping between network element identifiers and managed elements. Instead, the gateway maintains operation requests tagged with a name of the associated network element, and the network element identifies itself under the same name at the time it polls for available requests. Accordingly, the managed entities authenticate themselves to the gateway before receiving requests.

The foregoing approaches are highly secure, because all communication is initiated by the managed network and therefore holes in firewalls or changes in address policy are not required. The approaches work across networking boundaries; a managed network that uses network address translation (NAT), PAT, dynamic NAT, etc., does not present an obstacle to the approaches herein. The approaches may be used with any management application and are not restricted to configuration operations. There is no need to maintain and manage management sessions or implement logic to handle failover; from the perspective of the network or network element, only one session exists. Thus, there is no need to maintain multiple sessions, and there are no issues with regards to limitations in terms of number of management sessions.

3.2 Enabling Network-Initiated Remote Monitoring and Maintenance Operations

The process of FIG. 4 may be performed by a network entity that monitors itself and reports information to a management point. For example, the process of FIG. 4 is performed by management communication program 126 of network element 122, which provides specified information to management services 106 through link 108B.

In step 402, a managed network entity monitors itself and in step 404, one or more specified conditions at the managed network entity are evaluated. As tested at step 406, if any specified condition is met, then control proceeds to steps 408, 410, 412, 414. In step 408, specified information is gathered from the managed network entity. In step 410, a message is prepared that includes the specified information that was gathered, as well as information identifying the specified conditions that were satisfied.

In step 412, authenticated communication is initiated to one or more management services. For example, network element 122 establishes secure communication over link 108B to management services 106. In step 414, the message prepared at step 410 is sent to the management services. In one embodiment, the message prepared at step 410 identifies and is directed to a specific server within management services 106 that can evaluate and take action on the message. The message may be sent at step 414 using any of several transport mechanisms, such as e-mail, FTP of a file that contains the message, etc. In an embodiment, message communication is secure and allows, for example, for encryption of the message content and authentication of the sender, such as management communication program 126.

According to an embodiment of the approach in this section, management communication program 126 of network element 122 acts as an agent that monitors a managed entity. If a set of conditions is met, management communication program 126 gathers specified information and transmits the specified information to a specified remote server, with information describing the circumstances that triggered the communication.

In various embodiments, the specified conditions can comprise one or more of the following: Alarm conditions; threshold alerts; security-related events; or a combination thereof, alone or with various configuration parameter information. Alarm conditions may comprise one or more alarms that occurred with a critical severity, alarms that occurred with a certain frequency, certain types of alarms that occurred, alarms whose condition has not cleared over a certain period of time, etc. Alarm conditions also may comprise a combination or pattern of alarms that are associated with a certain type or severity and that have occurred over a particular period of time. Threshold alerts may indicate utilization of a resource in excess of a particular threshold, for a certain period of time, or other operational state or load condition information. Security-related events may indicate that a particular security-related event occurred.

The information collected from the network element can include housekeeping information, trigger information, processing state information, or configuration information. As examples, housekeeping information may comprise an identification of the agent, time of day, type of communication, etc. Trigger information may comprise a set of information triggering the communication, such as current alarm conditions, state information such as resource utilization, configuration parameters, etc. Processing state information may comprise a core dump, activity logs, a current running configuration, state data from the output of "show" CLI commands, etc.

Management services 106 may comprise one or more configuration tools that may be used to establish the specified conditions and specified information that are used at step 404, 408. Such conditions and information may be defined by meta-data in a configuration file, for example.

As indicated in step 412, authenticated communication may be used. Requiring the management communication program 126 to authenticate to management services 106 provides security, and also may be used to ensure proper billing (if any) for the call. The remote server can then initiate further management action, alert operations staff, etc.

When management communication program 126 is hosted within a network element as in FIG. 1, FIG. 2A, the management communication program may perform monitoring only of the associated network element 122. Alternatively, when management communication program 126 is hosted in a proxy server as in FIG. 2B, the management communication program may monitor any device in private enterprise network 120, or a specified range or set of devices. In the embodiment of FIG. 2B, the specified conditions that are tested in step 404, 406 of FIG. 4 may be established with respect to all devices in network 120 or with respect to one or more selected devices.

The approaches of this section provide remote monitoring on-demand, in which a management point is only contacted for critical situations, thereby eliminating the need for monitoring capacity of processing resources at the service provider. The approaches are efficient with respect to consumption of bandwidth, in particular because there is no consumption of management bandwidth for ongoing monitoring. The approaches are highly secure because the communication is initiated from inside the managed network, and there is no intrusion into the network by the service provider. The approaches minimize the need for follow-up management interactions because comprehensive context information is provided in each report.

In alternative embodiments, the foregoing approaches may be used for statistical analysis of networks. For example, automatic upload of statistical data may be provided to a statistics server, which processes the data and generates statistical reports. Such an embodiment may be useful in the context of monitoring compliance with service level agreements (SLAs), for example. In another embodiment, the approaches herein may be used to apply updates, patches, etc.

4.0 Implementation Mechanisms—Hardware Overview

Figure 5:
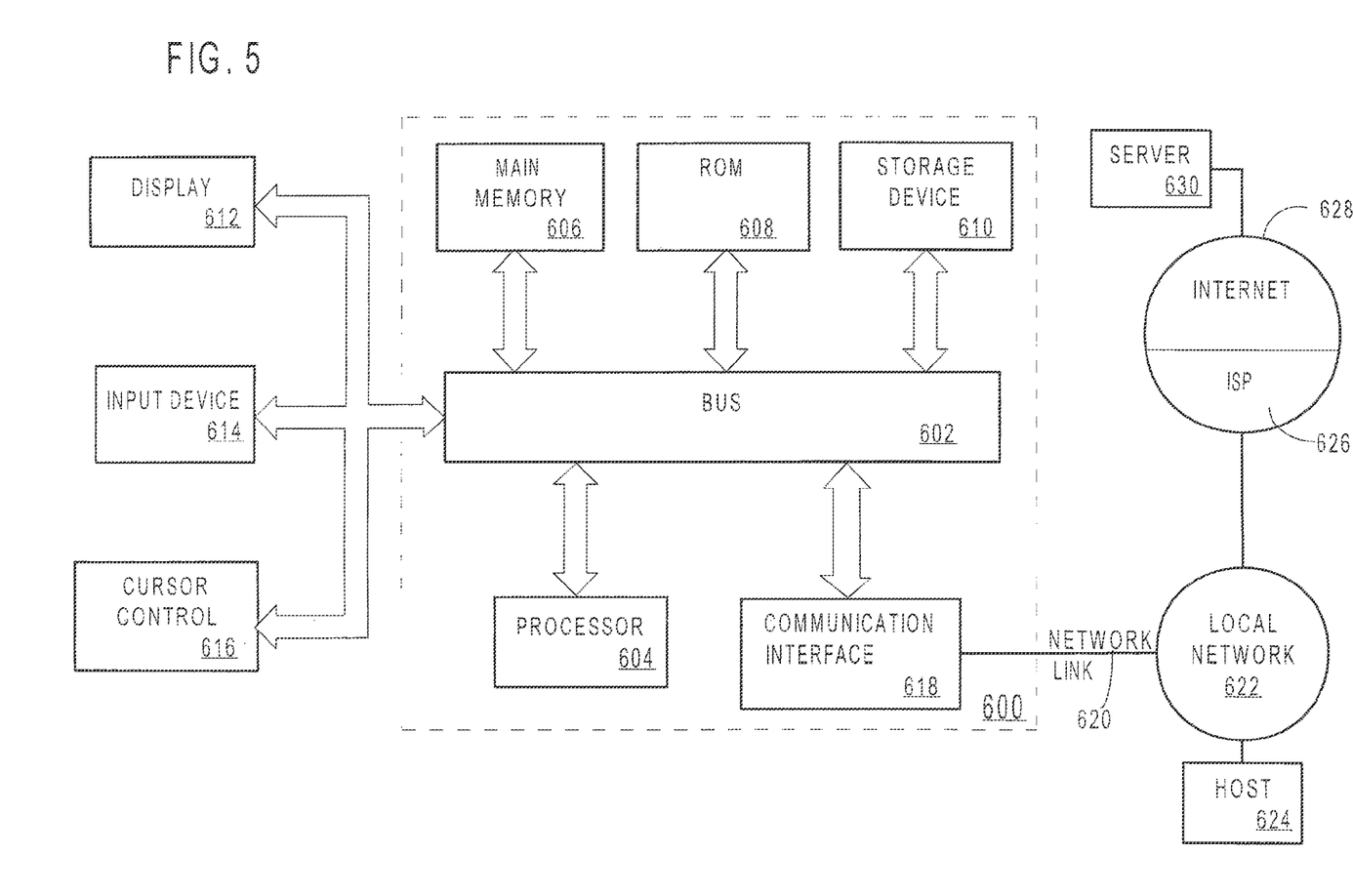
FIG. 5 is a block diagram that illustrates a computer system upon which an embodiment may be implemented.

FIG. 5 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for device-initiated network management. According to one embodiment of the invention, device-initiated network management is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for device-initiated network management as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   in a network element:
   receiving a first definition of a trigger for the network element, the trigger comprising one or more conditions;
   receiving a second definition of report information specifying the type of information to be gathered at the network element, wherein a report is to be created at the network element based on the received second definition and is to be communicated to a management application when at least one condition of the one or more conditions of the trigger is satisfied at the network element, wherein the management application is external to the network element;
   determining that the trigger defined by the first definition is satisfied at the network element, and in response thereto, initiating communication of the report created at the network element based on the received second definition to a management application or a management proxy.

2. The method as recited in claim 1, wherein the one or more conditions comprise a state of the network element, an event, an alarm, a combination of events or alarms, or a pattern of events or alarms.

3. The method as recited in claim 1, wherein the report information comprises any of a core dump from the network element, a configuration of the network element, state information for the network element, a log of the network element, information about the one or more conditions of the trigger.

4. The method as recited in claim 1, wherein the steps are performed by a proxy server, wherein the proxy server is logically separate from the network element, wherein the proxy server manages notifications to the management application for a plurality of network elements.

5. The method as recited in claim 1, wherein the first definition and the second definition are received from a configuration tool associated with the management application.

6. The method as recited in claim 1, wherein the communication of the report information is initiated without the management application having solicited the report information between the time the one or more conditions were satisfied at the network element and the time the communication of the report information is initiated.

7. The method as recited in claim 1, further comprising requesting, from the management application prior to receiving the first definition or second definition, definition information associated with the network element.

8. One or more non-transitory computer-readable media comprising instructions that, when executed by one or more computing devices, cause:
   in a network element:
   receiving a first definition of a trigger for the network element, the trigger comprising one or more conditions;
   receiving a second definition of report information specifying the type of information to be gathered at the network element, wherein a report is to be created at the network element based on the received second definition and is to be communicated to a management application when at least one condition of the one or more conditions of the trigger is satisfied at the network element, wherein the management application is external to the network element;
   determining that the trigger defined by the first definition is satisfied at the network element, and in response thereto, initiating communication of the report created at the network element based on the received second definition to a management application or a management proxy.

9. The one or more computer-readable media of claim 8, wherein the one or more conditions comprise a state of the network element, an event, an alarm, a combination of events or alarms, or a pattern of events or alarms.

10. The one or more computer-readable media of claim 8, wherein the report information comprises any of a core dump from the network element, a configuration of the network element, state information for the network element, a log of the network element, information about the one or more conditions of the trigger.

11. The one or more computer-readable media of claim 8, wherein the instructions are executed by a proxy server, wherein the proxy server is logically separate from the network element, wherein the proxy server manages notifications to the management application for a plurality of network elements.

12. The one or more computer-readable media of claim 8, wherein the first definition and the second definition are received from a configuration tool associated with the management application.

13. The one or more computer-readable media of claim 8, wherein the communication of the report information is initiated without the management application having solicited the report information between the time the one or more conditions were satisfied at the network element and the time the communication of the report information is initiated.

14. The one or more computer-readable media of claim 8, further comprising instructions that, when executed be one or more computing devices, cause requesting, from the management application prior to receiving the first definition or second definition, definition information associated with the network element.

15. An apparatus comprising:
a network interface that is coupled to the data network for receiving one or more packet flows therefrom;
one or more processors;
a subsystem that receives a first definition of a trigger for a network element, the trigger comprising one or more conditions;
a subsystem that receives a second definition of report information specifying the type of information to be gathered at the network element, wherein a report is to be created at the network element based on the received second definition and is to be communicated to a management application when at least one condition of the one or more conditions of the trigger is satisfied at the network element, wherein the management application is external to the network element;
a subsystem that determines that the trigger defined by the first definition is satisfied at the network element, and in response thereto, initiates communication of the created at the network element based on the received second definition to a management application or a management proxy.

16. The apparatus as recited in claim 15, wherein the one or more conditions comprise a state of the network element, an event, an alarm, a combination of events or alarms, or a pattern of events or alarms.

17. The apparatus as recited in claim 15, wherein the report information comprises any of a core dump from the network element, a configuration of the network element, state information for the network element, a log of the network element, information about the one or more conditions of the trigger.

18. The apparatus as recited in claim 15, wherein the apparatus is a proxy server, wherein the proxy server is logically separate from the network element, wherein the proxy server manages notifications to the management application for a plurality of network elements.

19. The apparatus as recited in claim 15, wherein the first definition and the second definition are received from a configuration tool associated with the management application.

20. The apparatus as recited in claim 15, wherein the communication of the report information is initiated without the management application having solicited the report information between the time the one or more conditions were satisfied at the network element and the time the communication of the report information is initiated.

21. The apparatus as recited in claim 15, further comprising a subsystem that requests, from the management application prior to receiving the first definition or second definition, definition information associated with the network element.

* * * * *